E. M. COOMBES.
Hominy Mill.

No. 105,430. Patented July 19, 1870.

United States Patent Office.

EDEN M. COOMBES, OF MEMPHIS, INDIANA.

Letters Patent No. 105,430, dated July 19, 1870.

IMPROVEMENT IN HOMINY-MILLS.

The Schedule referred to in these Letters Patent and making part of the same.

*To all whom it may concern:*

Be it known that I, EDEN M. COOMBES, of Memphis, in the county of Clark and in the State of Indiana, have invented certain new and useful Improvements in Hominy-Mills; and do hereby declare that the following is a full, clear, and exact description thereof, reference being had to the accompanying drawing and to the letters of reference marked thereon, making a part of this specification.

The nature of my invention consists in the construction and arrangement of a "hominy-mill," as will be hereinafter fully set forth.

In order to enable others skilled in the art to which my invention appertains to make and use the same, I will now proceed to describe its construction and operation, referring to the annexed drawing, in which—

A represents the frame-work of my machine, in which is, by suitable means, suspended a circular sheet-iron pan, B, having a lid, C, part of which is firmly secured, and the balance is hinged and fastened by a button, D.

The bottom of the pan B is inclined from its edges or outer periphery downward to the outer edge or periphery of a core, E, placed in the center of the pan.

The thus inclined bottom of the pan B is perforated with a number of slots, so as to allow the meal, of which there is always more or less made, as the corn is reduced, to fall out and be separated from the hominy.

This bottom is also provided with a door, G, through which the hominy is discharged even when the mill is in motion.

An upright shaft, H, passes through the upper portion of the frame A and through the lid C, and has a collar, a, on it, which rests upon the lid, and consequently supports the shaft.

On the lower end of the upright shaft H is secured a series of curved horizontal arms I I, forming a reel, on the under side of which the cutting-knives are firmly attached.

Figure 1:
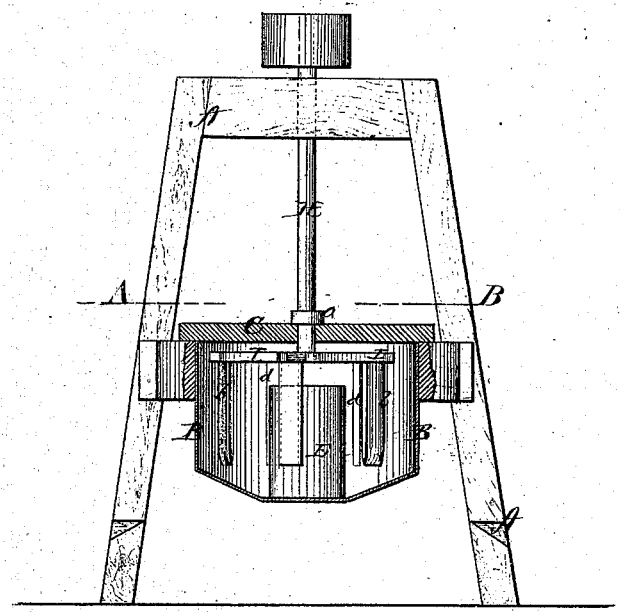
Figure 1 is a side elevation, part in section, of my hominy-mill.
Figure 2:
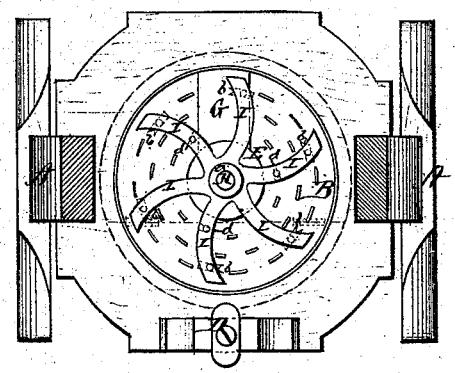
Figure 2 is a horizontal section of the same, taken through line A B of fig. 1.

These knives are perpendicular, some of them, b b, being double-edged, and others, d d, single-edged, as seen in fig. 2.

The arms I I being curved, it places the outer knives a little in advance of the ones next to them, in like manner the next ones, and so on, in order that the corn may be equally distributed over the bottom of the concave pan.

The corn is kept a suitable distance from the exact center by means of the core E, which may be of any desirable size and material, so that the corn may be reduced as fast by the middle knives as by the outer.

The corn is put in the pan B by means of the hinged portion of the lid C, and the upright shaft H put in motion in the direction as indicated by the points of the arms I I.

Having thus fully described my invention,

What I claim as new, and desire to secure by Letters Patent, is—

1. The combination of the circular pan B, provided with an inclined bottom and core E, shaft H, and horizontal reel I I, with double-edge knives b b and single-edge knives d d, all constructed to operate substantially in the manner set forth.

2. The combination of the double knives b b and single knives d d, all arranged on the reel I, substantially as shown and described.

3. The combination of the pan B, core E, door G, shaft H, arms I I, and knives b b and d d, all constructed and arranged as described, to operate substantially in the manner and for the purposes herein set forth.

In testimony that I claim the foregoing, I have hereunto set my hand this 5th day of October, 1869.

EDEN M. COOMBES.

Witnesses:
E. S. BAILEY,
T. J. COFFMAN.